Sept. 1, 1925.
B. F. WINTERHOFF
ELECTRIC GAUGE FOR GASOLINE TANKS
Filed Oct. 27, 1922 2 Sheets-Sheet 1
1,552,373
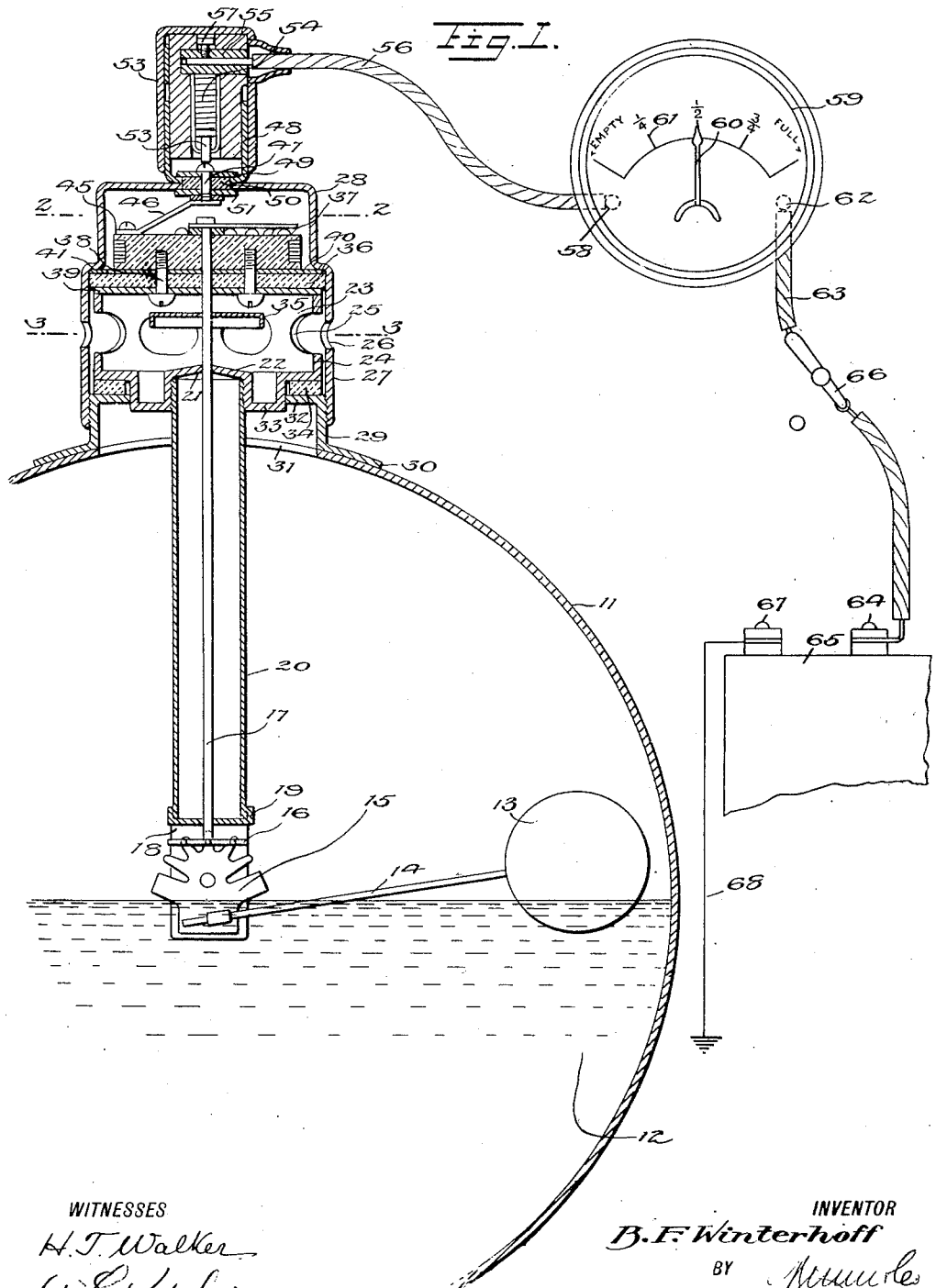

Sept. 1, 1925. 1,552,373
B. F. WINTERHOFF
ELECTRIC GAUGE FOR GASOLINE TANKS
Filed Oct. 27, 1922 2 Sheets-Sheet 2
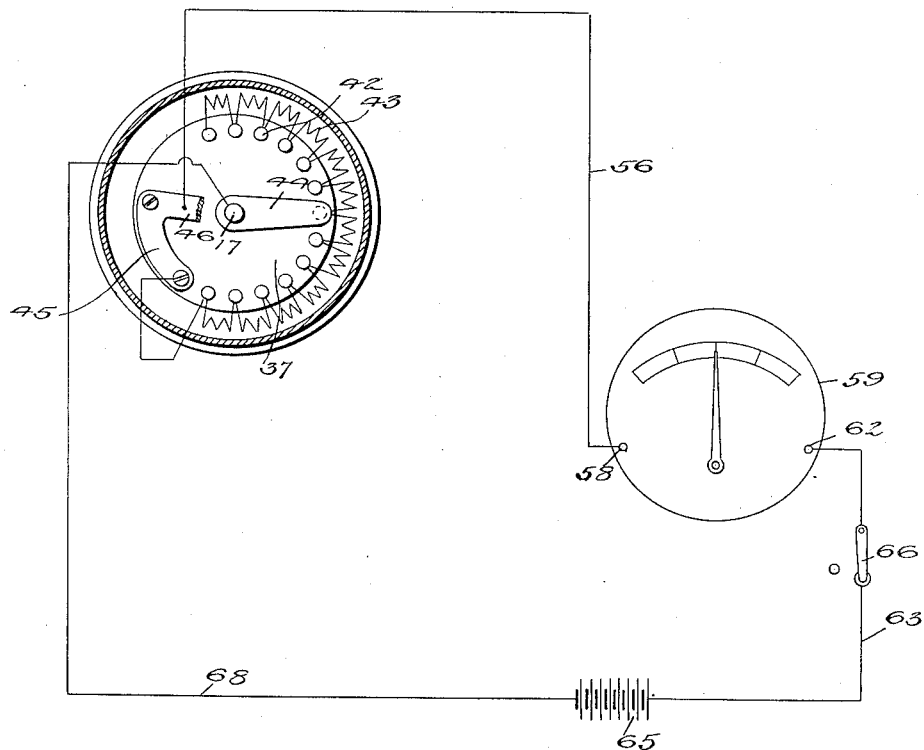
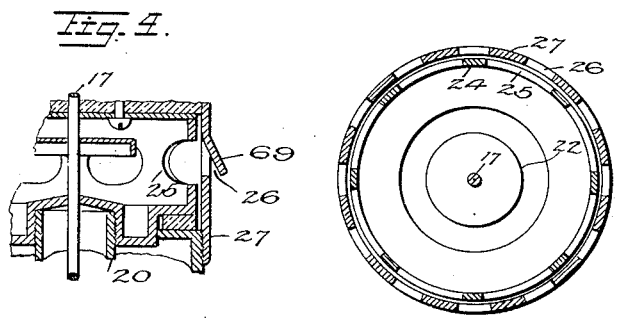
WITNESSES
H. J. Walker
G. L. Kitchin
INVENTOR
B. F. Winterhoff
BY
ATTORNEYS

Patented Sept. 1, 1925.

1,552,373

UNITED STATES PATENT OFFICE.

BENJAMIN FRANKLIN WINTERHOFF, OF ELKHART, INDIANA, ASSIGNOR TO NATIONAL GAUGE AND EQUIPMENT COMPANY, OF LA CROSSE, WISCONSIN, A CORPORATION OF WISCONSIN.

ELECTRIC GAUGE FOR GASOLINE TANKS.

Application filed October 27, 1922. Serial No. 597,376.

*To all whom it may concern:*

Be it known that I, BENJAMIN F. WINTERHOFF, a citizen of the United States, and a resident of Elkhart, in the county of Elkhart and State of Indiana, have invented a new and Improved Electric Gauge for Gasoline Tanks, of which the following is a full, clear, and exact description.

This invention relates to electric gauges for gasoline tanks and has for an object to provide an improved construction wherein there is provided an air space between the tank and the rheostat which controls the passage of current.

Another object of the invention is to provide an improved gauge for gasoline tanks wherein the circuit is normally open but may be closed manually at any time and when closed will indicate through an electrically operated member, the amount of gasoline in the tank.

A still further object of the invention is to provide an electrically operated gauge for tanks wherein the electric circuit includes an improved rheostat arranged in the substantially sealed compartment but in operative connection with the float in the tank.

In the accompanying drawings—

Figure 1 is a transverse section through a gasoline tank and through certain parts of a gauge embodying the invention.

Figure 2 is a diagram showing the electric circuit used in connection with the structure shown in Figure 1, the rheostat illustrated being shown as a section on line 2—2 of Figure 1.

Figure 3 is a fragmentary sectional view through Figure 2 approximately on line 3—3.

Figure 4 is a detail fragmentary view similar to part of the structure shown in Figure 1 but disclosing a modified form of ventilated hood.

Referring to the accompanying drawings by numeral, 11 indicates a gasoline tank which is provided with a supply of gasoline 12, said gasoline supporting the float 13. This float is connected by a rod 14 with a segmental gear 15 meshing with the pinion 16 rigidly secured to the shaft 17. The segmental gear 15 and associated parts are mounted on a suitable bracket 18 either rigidly secured to or formed integral with a bottom cap 19 threaded or otherwise secured to the bottom of the tube 20. The cap 19 is provided with an aperture through which shaft 17 passes, said shaft snugly fitting in the aperture and also snugly fitting in the aperture 21 formed in the bottom 22 of what may be termed an air cup 23. This cup is provided with an annular upstanding wall 24 having a number of apertures 25 adapted to be brought into registry with the apertures 26 of the annular depending wall 27 of hood 28. The wall 27 is threaded onto the upstanding flange 29 which flange is provided with an annular section 30 soldered or otherwise rigidly secured to the tank 11 and surrounding the opening 31 in said tank. It will be noted that there is an inwardly extending flange 32 extending from the flange 29, said inwardly extending flange fitting tightly against the depending annular section 33 of bottom 22 and also between the bottom 22 and the flange 32 there is arranged a gasket or packing 34 so that gasoline or any fumes therefrom cannot pass upwardly into the cup 23. The arrangement of the cup 23 provides an air chamber which is ventilated and, consequently, permits air to pass therethrough and any gasoline vapors to pass therefrom.

In case there should be a slight leakage of fumes through the aperture 21, said fumes will strike against the deflecting disk 35 and will then pass out through the apertures 25 and 26. By reason of the easy egress of vapor from the cup 23, none will attempt to pass upwardly around the packing disk 36 secured to the rheostat 37 by means of the respective screws 38 and the clamping plate 39. The bottom of the rheostat 37 is provided with a metal disk 40 adapted to press against the shoulder 41 of the hood 28 or rather this shoulder presses against the disk 40. The wall 27 is screwed onto the flange 29 so that the plate or disk 39 is pressed tightly against the annular wall 24. The rheostat 37 is provided with a number of contacts 42 connected by suitable resistance coils 43, said contacts being adapted to be engaged by the outer end of the arm 44 rigidly secured in any desired manner to the upper end of the shaft 17 so that when said shaft is rotated through the action of the float 13 and associated parts, the arm 44 will be moved correspondingly. A stationary contact 45 co-acts with the contact 44, said stationary contact being provided with a resilient or spring arm 46 adapted to press against the lower end of the screw 47 which acts as a terminal, said screw in addition acting to clamp the inverted cup-shaped structure 48 against the top of the hood 28 and also clamp the various insulating plates 49, 50 and 51 in place.

Co-acting with the inverted cup-shaped member 48 is a socket 52 which slidingly fits thereover, said socket carrying a spring pressed terminal 53, said spring pressed terminal being connected through the spring 54 to the tubular post 55 into which the end of the wire 56 is inserted, said end being clamped in place by a clamping screw 57. The wire 56 at the opposite end is connected to the binding post 58 of the gauge 59, which gauge may be any suitable structure which will electrically operate the pointer 60 to cause the same to move over the various graduations 61. It has been found that an ordinary voltmeter will answer the purpose by changing the graduations to be as shown in Figure 1. Preferably, these graduations show the words "Empty" and "Full" together with numbers indicating the degree of fullness at all times. The gauge 59 is provided with a second binding post 62 connected by a conductor 63 to one binding post 64 of a source of current 65. A manually actuated switch 66 is interposed in the conductor 63 whereby the circuit may be opened and closed at any time. The binding post 67 is grounded and, consequently, completes the circuit to the rheostat through the ground. For instance, when the switch 66 is closed, current may pass from the source of current 65 through the conductor 63 to binding post 62, through the windings in the gauge 59 to binding post 58, through wire 56 to the contact 45 through the desired resistance coils 43, to one of the contacts 42, arm 44 and the ground return indicated by wire 58 back to the battery 65. It is intended that the gauge 59 shall be arranged on the dashboard of an automobile or at some other convenient point and that the manually actuated switch 66 shall be arranged near the gauge while the battery 65 may be positioned at any desired point and the rheostat 37 and associated parts must be mounted on the tank 11.

In operation, the gauge 59 continually indicates the quantity of gasoline in the tank while the ignition switch 66 is turned on. The arrangement is such that whenever the ignition switch is turned on for starting the engine, the circuit illustrated in Figure 2 will be closed and, consequently, the various parts will function by reason of the continuous flowing of current from the source 65. When the ignition switch 66 is open for stopping the engine, the circuit shown in Figure 2 will also be open and the gauge will not be functioning.

In the construction shown in Figure 1, the apertures 25 and 26 are open so that the air may freely pass therein and also any vapors of gasoline may pass therethrough. As far as the circulation of air is concerned, this is very desirable but sometimes it may be objectionable on account of rain or dust and when a condition of this kind is to be met, the depending wall 27 of the hood 28 may be provided with pressed out sections 69 as shown in Figure 4 whereby the apertures 26 are hooded or partly covered. This construction will prevent to a large extent the entrance of dust and also prevent the entrance of rain while permitting the free egress of any gasoline vapors. It will also permit a ready circulation of air under ordinary circumstances. It will be noted that the arm 44 will move as the float 13 moves so that it will always be in the correct position whenever the ignition switch 66 is closed and does not necessarily move at the time that this switch is closed.

What I claim is:—

1. In an electric gauge, a casing, a series of contacts arranged in the arc of a circle in the casing, a resisting coil connecting the contacts, a contact having a spring arm, a fixed terminal carried by the casing and with which the spring arm of the contact engages, a revoluble float operated shaft, an arm on the shaft and movable over the series of contacts, a housing on the casing above the fixed terminal, a sliding and spring-pressed terminal in the housing, and a tubular post connected to the terminal by the spring of the terminal and in which a conductor is adapted to be secured.

2. In an electric gauge, a casing, a series of contacts arranged in an arc of a circle in the casing, a resisting element connecting the contacts, a float-operated arm movable over the contacts, a contact, a fixed terminal in the top of the casing and with which the said contact engages, and a sliding and spring-pressed terminal above the fixed terminal and having means for connecting a conductor thereto.

3. In an electrical gauge, a casing, a cup-shaped member on the top of the casing, a socket slidable on the said cup-shaped member, a spring-pressed terminal carried by the socket, a post for receiving a conductor carried by the socket above the terminal, said terminal being connected to the post by its spring, a fixed terminal in the top of the casing opposite the spring-pressed terminal, and a float-controlled rheostat in the casing and having a contact provided with a spring arm engaging the fixed terminal.

4. In an electric gauge, a hood adapted to be secured upon a gasoline tank, and having openings in its sides, an air cup in the lower part of the hood and having openings registering with the openings of the hood, a float controlled rheostat in the upper part of the hood and having a spring contact arm, a cup-shaped member on the top of the hood, a contact securing the cup to the hood and with which the spring contact arm engages, a socket slidable on the cup, a spring pressed contact carried by the socket, and a post for receiving a conductor carried by the socket and connected with the spring contact.

BENJAMIN FRANKLIN WINTERHOFF.